United States Patent
Li et al.

(10) Patent No.: US 7,016,209 B2
(45) Date of Patent: Mar. 21, 2006

(54) SINGLE STAGE AC/DC CONVERTER WITH PIEZO TRANSFORMER

(75) Inventors: Yun-Xiu Li, Shanghai (CN); Wei Chen, Fuchou (CN); Yung-Wei Peng, Taoyuan (TW)

(73) Assignee: DELTA Electronics, Inc., Taoyuan Hsien (TW)

( * ) Notice: Subject to any disclaimer, the term of this patent is extended or adjusted under 35 U.S.C. 154(b) by 1 day.

(21) Appl. No.: 10/709,282

(22) Filed: Apr. 27, 2004

(65) Prior Publication Data

US 2005/0156774 A1    Jul. 21, 2005

(30) Foreign Application Priority Data

Jan. 20, 2004    (TW)    ................................ 93101481 A

(51) Int. Cl.
*H02M 7/538*    (2006.01)
(52) U.S. Cl. ......................... 363/133; 363/22; 363/24
(58) Field of Classification Search ................ 363/133, 363/132, 22, 24, 23
See application file for complete search history.

(56) References Cited

U.S. PATENT DOCUMENTS

| | | | | |
|---|---|---|---|---|
| 4,814,962 A | * | 3/1989 | Magalhaes et al. | ........... 363/16 |
| 5,159,541 A | * | 10/1992 | Jain | ............................ 363/26 |
| 5,438,497 A | * | 8/1995 | Jain | ............................ 363/17 |
| 5,991,167 A | * | 11/1999 | Van Lerberghe | ............. 363/16 |
| 6,081,438 A | * | 6/2000 | Saint-Pierre et al. | .......... 363/95 |

* cited by examiner

*Primary Examiner*—Bao Q. Vu
(74) *Attorney, Agent, or Firm*—Jianq Chyun IP Office

(57) ABSTRACT

A single stage AC/DC converter with piezo transformer is provided. The AC/DC converter is suitable for converting an AC power into a DC power and is comprised of a rectification module, a switching module, a driving module, a piezo transformer, and an output rectification module. The present invention provides a new AC/DC converter with piezo transformer by combining the bulk circuit and the half-bridge circuit together.

27 Claims, 12 Drawing Sheets

SINGLE STAGE AC/DC CONVERTER WITH PIEZO TRANSFORMER

CROSS REFERENCE TO RELATED APPLICATIONS

This application claims the priority benefit of Taiwan application serial no. 93101481, filed Jan. 20, 2004.

BACKGROUND OF INVENTION

1. Field of the Invention

The present invention relates to an AC/DC converter with piezo transformer, and more particularly, to a single stage AC/DC converter with piezo transformer.

2. Description of Related Art

In order to reduce the usage of the chemical materials, an AC/DC converter is commonly provided in the electrical apparatus which uses DC power such as battery as its operating power, such that the electrical apparatus can use the AC power provided by the power company as its operating power. In general, the AC/DC converter converts an AC power into a DC power by using an electric-magnetic converter, and the piezo electric transformer is an electric-magnetic, which is most commonly used in the AC/DC converter now.

The piezo transformer is made of a ceramic material, and its energy is transmitted by the mechanical vibrations, thus it is characterized by smaller size, non-burnable, and high electric insulation. For the back light of the color LCD, the piezo transformer is an optimum power source. However, currently the developers are unable to propose a new method for making good use of the piezo transformer. As shown in FIG. 1, a half-bridge circuit 160 is commonly used as a part of the driving circuit in the AC/DC converter 15 with piezo transformer 150.

SUMMARY OF INVENTION

In the light of the preface, the present invention is directed to a single stage AC/DC converter with piezo transformer. A new architecture of using the piezo transformer is provided by combining the bulk circuit and the half-bridge circuit together.

The present invention is also related to a single stage AC/DC converter with piezo transformer, in which a simple circuit is used to replace the half-bridge circuit of a common AC/DC converterr with piezo transformer.

According to an embodiment of the present invention, a single stage AC/DC converter with piezo transformer suitable for convening AC power into DC power is provided. The single stage AC/DC converter comprises a rectification module, a switching module, a driving module, a piezo transformer and an output rectification module. Wherein, the rectification module comprises a pair of rectification input terminals, a first rectification output terminal and a second rectification output terminal. The pair of rectification input terminals receives an AC power and coverts the AC power into a rectification output signal, which is then propagated to the first rectification output terminal. The switching module comprises a bulk circuit, a half-bridge circuit, a first switching diode, and a second switching diode. The bulk circuit comprises a bulk input terminal, a first bulk output terminal, and a second bulk output terminal. The bulk input terminal electrically couples to the first rectification output terminal mentioned above for receiving the rectification output signal, and a bulk signal is generated from the first bulk output terminal after the rectification output signal is processed by the bulk circuit. The half-bridge circuit comprises a first half-bridge input terminal, a second half-bridge input terminal, and a half-bridge output terminal. The first half-bridge input terminal electrically couples to the first bulk output terminal mentioned above, and the second half-bridge input terminal electrically couples to the second rectification output terminal mentioned above. An anode electrode of the first switching diode electrically couples to the second half-bridge input terminal, and a cathode electrode electrically couples to the second bulk output terminal. An anode electrode of the second switching diode electrically couples to the second bulk output terminal, and a cathode electrode electrically couples to the half-bridge output terminal. The driving module electrically coupled to the second bulk output terminal and the half-bridge output terminal of the switching module motioned above blocks the DC bias which is output from the half-bridge output terminal, and generates a driving signal after the signal obtained from blocking the DC bias is resonated. The piezo transformer generates a corresponding piezo transforming signal according to the driving signal. The output rectification module comprises a rectification circuit and an output load. The rectification circuit rectifies the piezo transforming signal and generates a DC power on both terminals of the output load.

In an embodiment of the present invention, the bulk circuit mentioned above comprises a bulk input inductor, a bulk capacitor and a bulk diode. One electrode of the bulk input inductor electrically couples to the first rectification output terminal, and the other electrode electrically couples to the first bulk output terminal. One electrode of the bulk capacitor electrically couples to the first bulk output terminal, and the other electrode electrically couples to the second bulk output terminal. An anode electrode of the bulk diode electrically couples to the second bulk output terminal, and a cathode electrode electrically couples to the first rectification output terminal. In addition, the switching module mentioned above may further comprise a flyback diode and a flyback transforming inductor. Wherein, a cathode electrode of the flyback diode electrically couples to one terminal of the output load, and the flyback transforming inductor is induced each other with the bulk input inductor mentioned above. One terminal of the flyback transforming inductor is grounded, and the other terminal is electrically coupled to the anode electrode of the flyback diode.

The present invention further provides a single stage AC/DC converter with piezo transformer suitable for converting AC power into DC power. The single stage AC/DC converter comprises a rectification module, a switching module, a driving module, a piezo transformer and an output rectification module. Wherein, the rectification module comprises a pair of rectification input terminals, a first rectification output terminal, and a second rectification output terminal. The pair of rectification input terminals receives an AC power and coverts the AC power into a rectification output signal which is then propagated to the first rectification output terminal. The switching module comprises a bulk circuit, a half-bridge capacitor and a half-bridge circuit. The bulk circuit comprises a bulk input terminal and a bulk output terminal. The bulk input terminal receives the rectification output signal, processes the rectification output signal with its bulk circuit, and generates and propagates a bulk signal to the bulk output terminal. The half-bridge circuit comprises a first switch, a second switch, and a half-bridge output terminal. One terminal of the first switch electrically couples to one terminal of the half-bridge capacitor, and the other terminal of the first switch electrically couples to one terminal of the second switch, the half-bridge output terminal, and the bulk output terminal. The other terminal of the second switch electrically couples to the other terminal of the half-bridge capacitor and the second rectification output terminal. The driving module electrically coupled to the half-bridge output terminal and the second rectification output terminal blocks the DC bias which is output from the half-bridge output terminal, and generates a driving signal after the signal obtained from blocking the DC bias is resonated. The piezo transformer generates a corresponding piezo transforming signal according to the driving signal. The output rectification module comprises a rectification circuit and an output load. The rectification circuit rectifies the piezo transforming signal and generates a DC power on both terminals of the output load.

In an embodiment of the present invention, the bulk circuit mentioned above is a bulk input inductor. One terminal of the bulk input inductor electrically couples to the first rectification output terminal, and the other terminal electrically couples to the half-bridge output terminal. In addition, the switching module in such case may further comprise a flyback diode and a flyback transforming inductor. A cathode electrode of the flyback diode electrically couples to one terminal of the output load, and the flyback transforming inductor is induced each other with the bulk input inductor. One terminal of the flyback transforming inductor is grounded, and the other terminal is electrically coupled to an anode electrode of the flyback diode.

The present invention provides a simple circuit to operate the A/D converter with piezo transformer by combining the bulk circuit and the half-bridge circuit together. In addition, the new circuit configuration is totally different from the currently used circuit configuration, thus the present invention provides a new direction to the circuit designers, such that the circuit designed are stimulated to improve the circuit design.

BRIEF DESCRIPTION OF DRAWINGS

The accompanying drawings are included to provide a further understanding of the invention, and are incorporated in and constitute a part of this specification. The drawings illustrate embodiments of the invention, and together with the description, serve to explain the principles of the invention.

DETAILED DESCRIPTION

Figure 2:
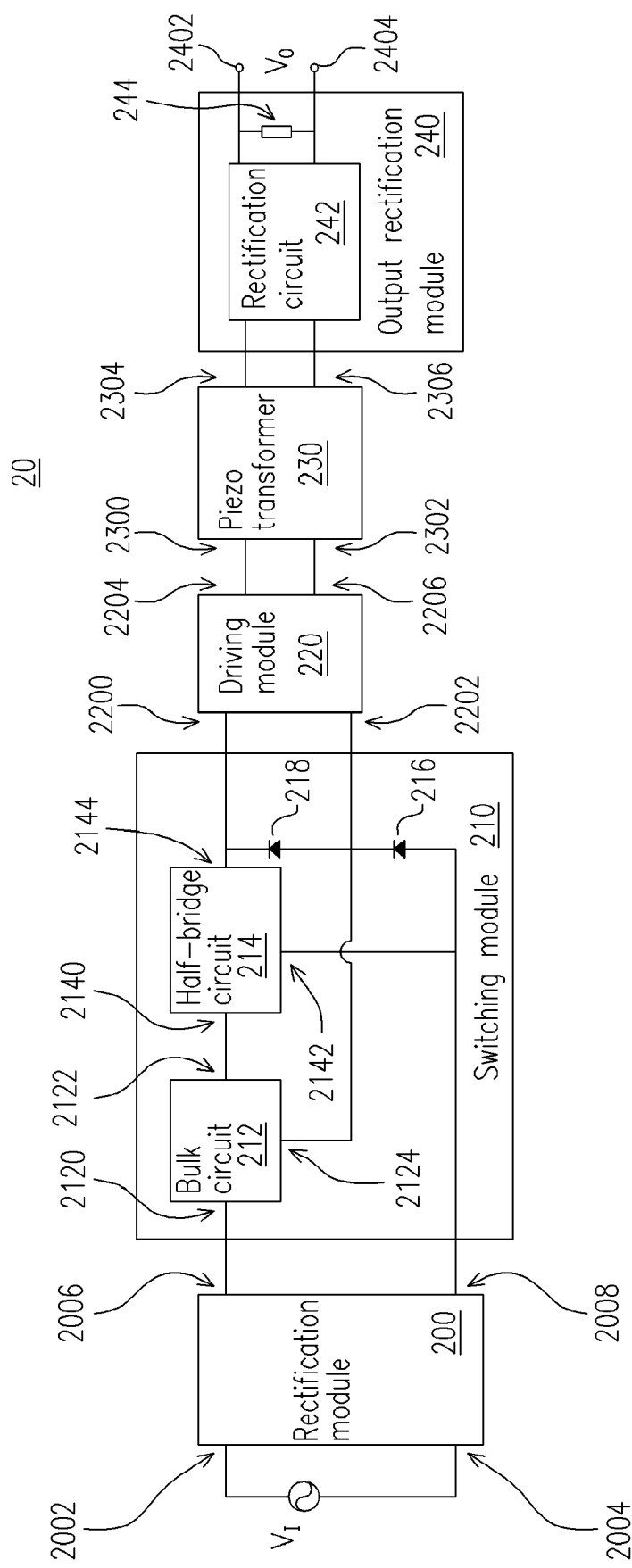
FIG. 2 is a schematic circuit diagram of a single stage AC/DC converter with piezo transformer according to an embodiment of the present invention.

FIG. 2 is a schematic circuit diagram of a single stage AC/DC converter with piezo transformer according to an embodiment of the present invention. In the present embodiment, the single stage AC/DC converter 20 comprises a rectification module 200, a switching module 210, a driving module 220, a piezo transformer 230 and an output rectification module 240. In normal operation, the single stage AC/DC converter 20 is connected the rectification module 200 to an AC power $V_I$, and an internal circuit of the single stage AC/DC converter 20 is used to convert the AC power $V_I$ into a DC power $V_O$ for providing power to the electrical apparatus connected to it.

Figure 1:
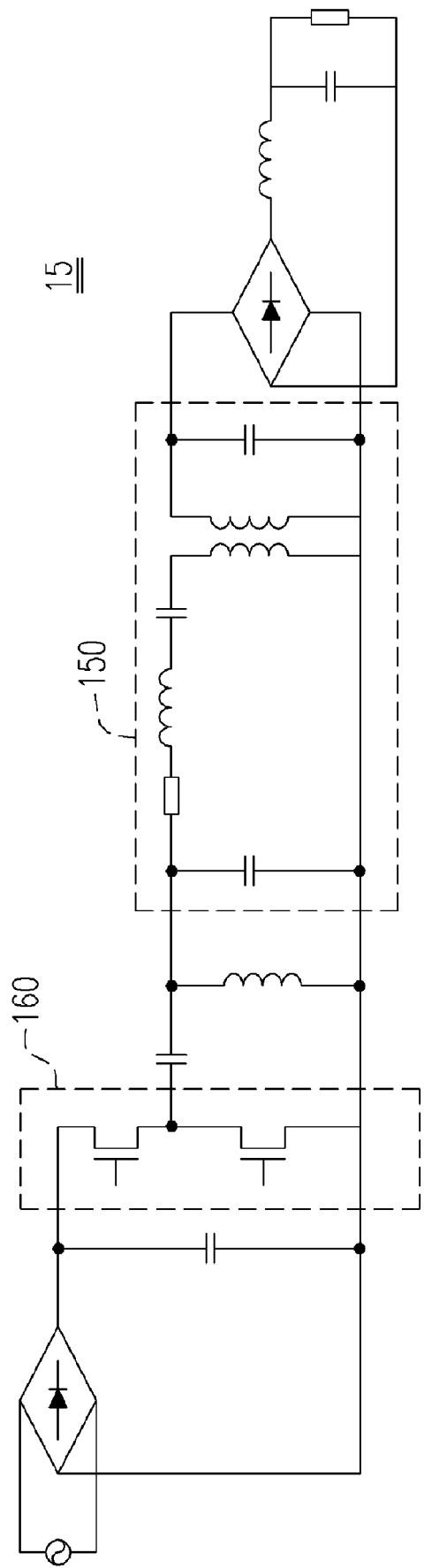
FIG. 1 is a schematic circuit diagram of a conventional AC/DC converter with piezo transformer.

Comparing with the conventional technique as shown in FIG. 1, one of the differences is in its implementation of the switching module 210. As shown in FIG. 2, the switching module 210 of the present embodiment comprises a bulk circuit 212, a half-bridge circuit 214, and two switching diodes 216 and 218. Wherein, the bulk circuit 212 comprises a bulk input terminal 2120 and bulk output terminals 2122 and 2124. The bulk input terminal 2120 electrically couples to the rectification output terminal 2006 for receiving the rectification output signal mentioned above, and a bulk signal is generated from the bulk output terminal 2122 after the rectification output signal is processed by the bulk circuit 212. The half-bridge circuit 214 comprises half-bridge input terminals 2140 and 2142, and a half-bridge output terminal 2144. The half-bridge input terminal 2140 electrically couples to the bulk output terminal 2122, and the half-bridge input terminal 2142 electrically couples to the rectification output terminal 2008. In addition, an anode electrode of the switching diode 216 electrically couples to the half-bridge input terminal 2142, and a cathode electrode electrically couples to the bulk output terminal 2124. An anode electrode of the switching diode 218 electrically couples to the bulk output terminal 2124, and a cathode electrode electrically coupled to the half-bridge output terminal 2144.

In order to let one of the ordinary skill in the art better understand the technique of the present invention, a couple of embodiments are described in detail with reference to the accompanying diagrams, which describe the combination and the connection of the circuits in each module.

Figure 3A:
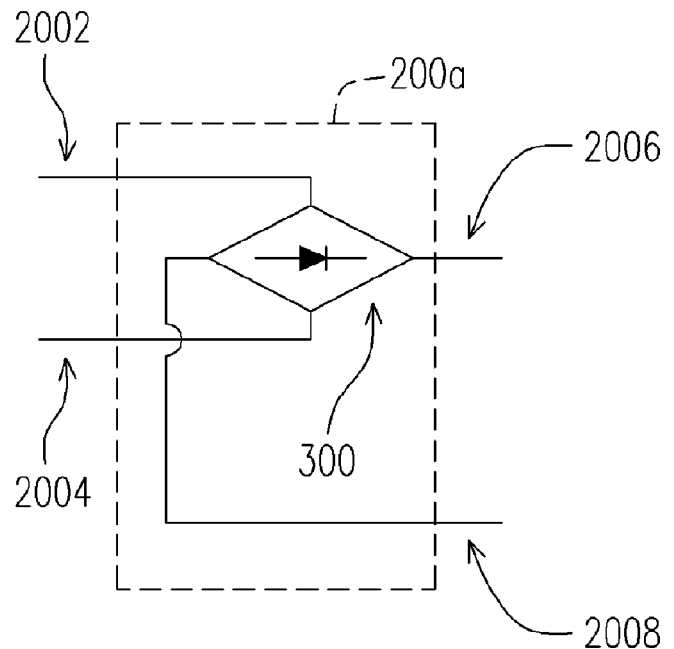
FIG. 3A is a schematic circuit diagram illustrating an embodiment of the rectification module as shown in FIG. 2.
Figure 3B:
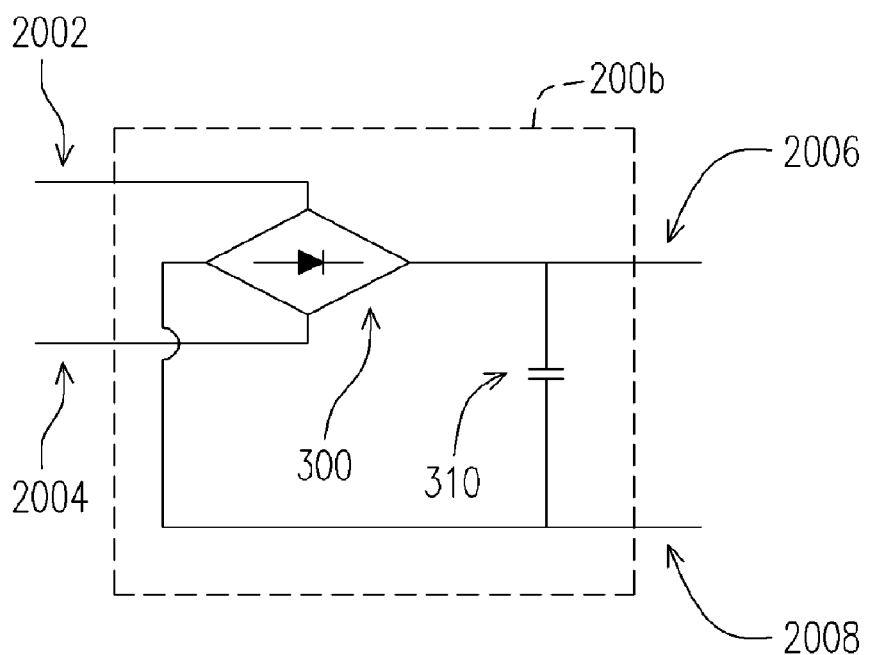
FIG. 3B is a schematic circuit diagram illustrating another embodiment of the rectification module as shown in FIG. 2.

Referring to FIG. 2 and FIG. 3A, wherein FIG. 3A is a schematic circuit diagram illustrates an embodiment of the rectification module as shown in FIG. 2. As shown in FIG. 3A, the rectification module 200a comprises a diode bridge rectifier 300. Wherein, two input terminals of the diode bridge rectifier 300 electrically couple to a rectification input terminal which is composed of the rectification input terminals 2002 and 2004, and two output terminals of the diode bridge rectifier 300 electrically couple to the rectification output terminals 2006 and 2008, such that the rectified signal is propagated as a rectification output signal from the rectification output terminal 2006. Similarly, referring to FIG. 3B, which schematically shows a circuit diagram illustrating another embodiment of the rectification module as shown in FIG. 2. It is obvious that the difference between the rectification module 200b as shown in FIG. 3B and the rectification module 200a as shown in FIG. 3A is that the rectification module 200b further comprises a rectification capacitor 310. The rectification capacitor 310 is electrically coupled in between the rectification output terminals 2006 and 2008, which makes the rectification output signal output from the rectification output terminal 2006 more smooth.

Figure 4:
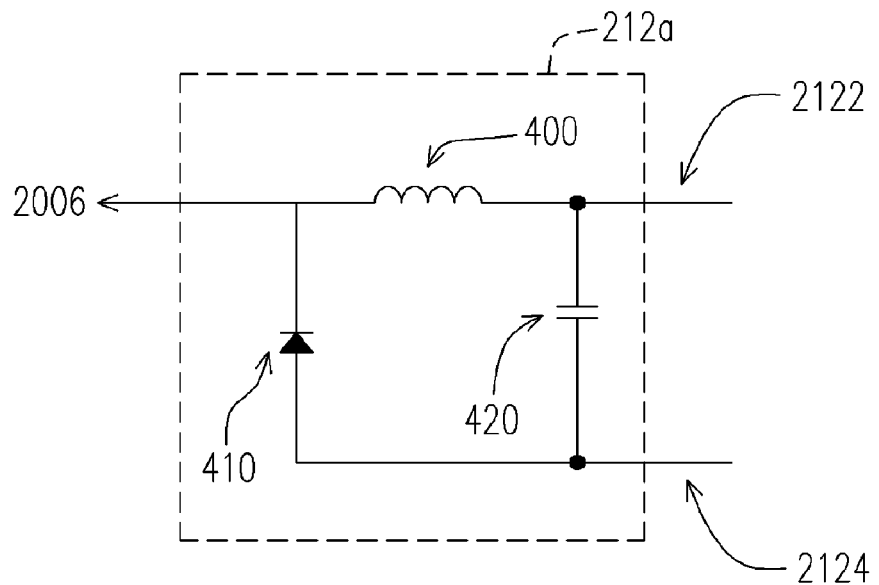
FIG. 4 is a schematic circuit diagram illustrating an embodiment of the bulk circuit used in the circuit configuration of the switching module as shown in FIG. 2.

Referring to FIG. 1 and FIG. 4, wherein FIG. 4 is a schematic circuit diagram illustrating an embodiment of the bulk circuit used in the circuit configuration of the switching module as shown in FIG. 2. In the present embodiment, the bulk circuit 212a comprises a bulk input inductor 400, a bulk diode 410, and a bulk capacitor 420. Wherein, two terminals of the bulk input inductor 400 electrically couple to the rectification output terminal 2006 and the bulk output terminal 2122, respectively. Two terminals of the bulk capacitor 420 electrically couple to the bulk output terminal 2122 and the bulk output terminal 2124, respectively. An anode electrode of the bulk diode 410 electrically couples to the bulk output terminal 2124, and a cathode electrode electrically couples to the rectification output terminal 2006. In addition, referring to FIG. 5, that schematically shows a circuit diagram of the half-bridge circuit, is used in the circuit configuration of the switching module as shown in FIG. 2. Wherein, the half-bridge circuit 214a comprises two switches 500 and 510. A first terminal 2140 of the switch 500 electrically couples to the boost output terminal 2124 for receiving a boost signal, and a second terminal electrically couples to the half-bridge output terminal 2144. A first terminal of the switch 510 electrically couples to the half-bridge output terminal 2144, and a second terminal 2142 electrically couples to the rectification output terminal 2008.

Figure 5:
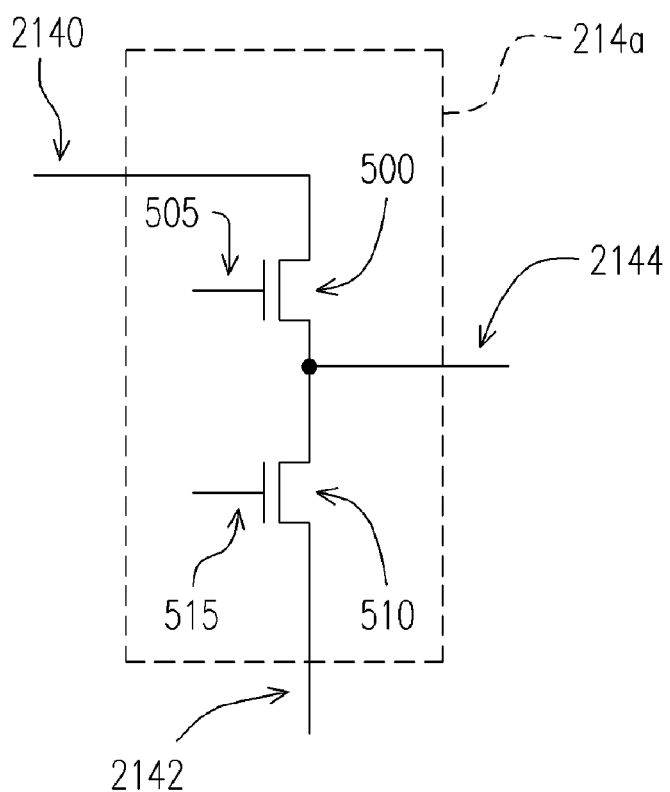
FIG. 5 is a schematic circuit diagram of the half-bridge circuit used in the circuit configuration of the switching module as shown in FIG. 2.

With the switching module related circuit as shown in FIG. 4 and FIG. 5, the present invention can easily combine the bulk circuit 212 and the half-bridge circuit 214 together, such that multiple switching circuits can be integrated into a single stage switching circuit. In an embodiment of the present invention, the switching diodes 216 and 218 are the mandatory components of the configuration as shown in FIG. 2. In addition, the switch 510 in the half-bridge circuit 214 is a switch commonly used by both the bulk circuit 212 and the half-bridge circuit 214, whereas the switch 500 is a switch solely used by the half-bridge circuit 214.

Figure 11:
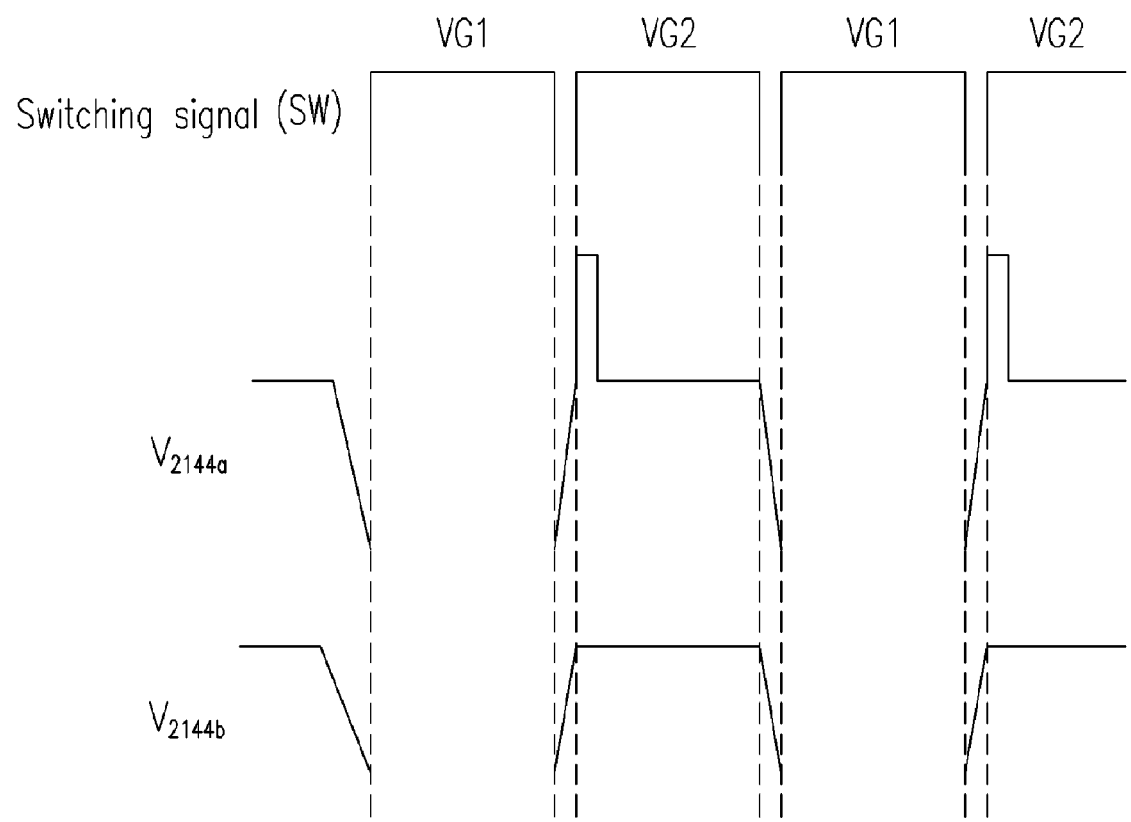
FIG. 11 is a diagram illustrating the relationship between the switching signal SW applied on the switch and the potential variance on the half-bridge output terminal.

However, although such configuration is able to achieve the purpose of integrating multiple switching circuits into a single stage switching circuit, the minor defect of it is a surge may be occurred on the half-bridge output terminal 2144. FIG. 11 is a diagram illustrating the relationship between the switching signal SW applied on the switches 500 and 510 and the potential variance on the half-bridge output terminal 2144. Wherein, VG1 is a signal applied on the terminal 505 of the switch 500, VG2 is a signal applied on the terminal 515 of the switch 510, and $V_{2144a}$ is a voltage variance measured on the half-bridge output terminal 2144 of the switching module composed of the switching modules shown in FIG. 4 and FIG. 5. As shown in the diagram, a higher transient voltage surge occurs at the moment the switch 510 is turned on.

In an embodiment of the present invention, order to avoid the transient voltage surge as shown in $V_{2144a}$, a flyback circuit is further added to the original bulk circuit in the present invention so as to constitute a flyback bulk circuit.

Figure 6:
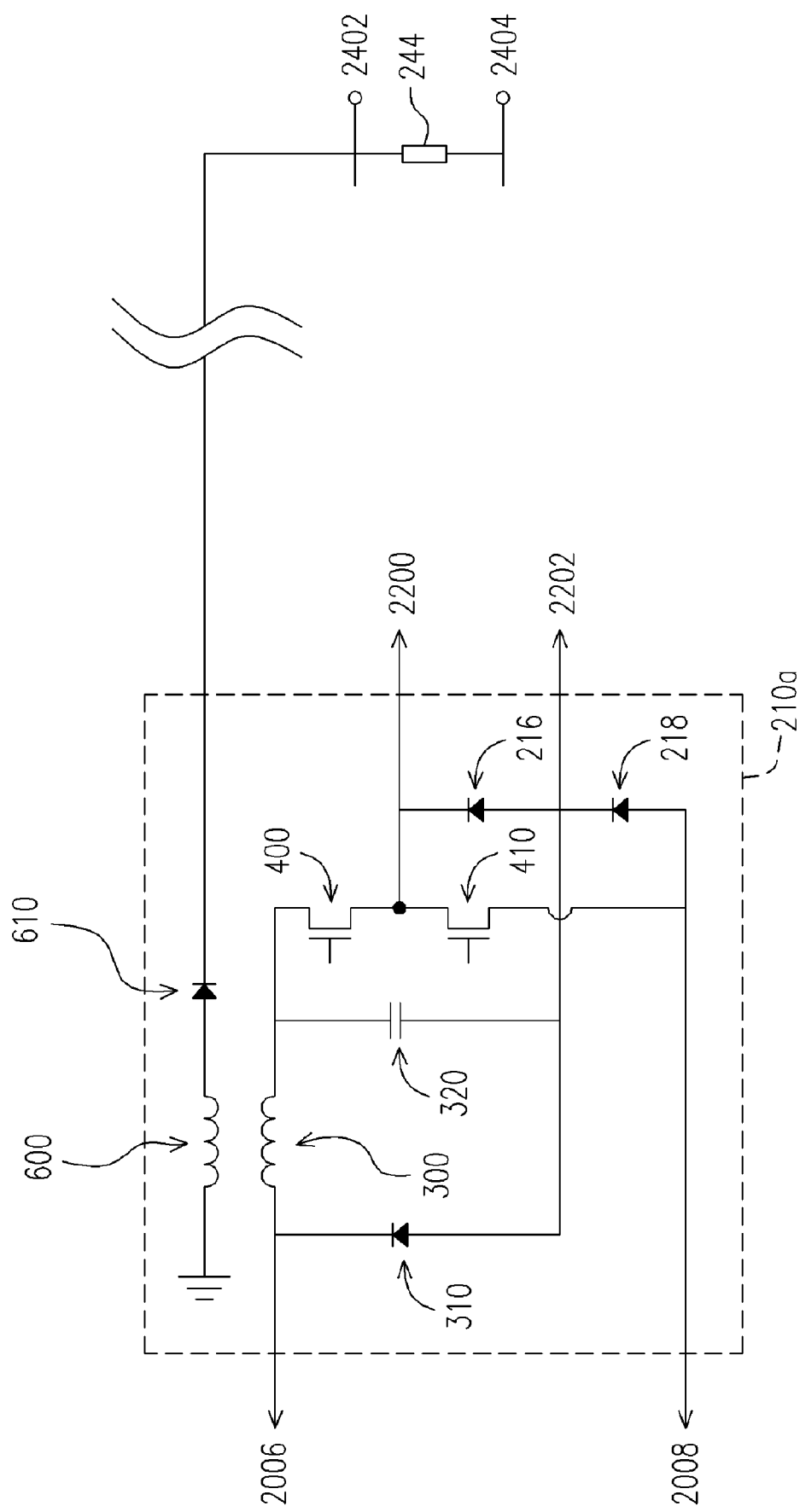
FIG. 6 is a schematic circuit diagram of a switching module according to another embodiment of the present invention.

FIG. 6 is a schematic circuit diagram of a switching module according to another embodiment of the present invention. As shown in the diagram, the difference between the present embodiment and the switching modules previously shown in FIGS. 2, 4 and 5 is that the switching module 210a further comprises a flyback transforming inductor 600 and a flyback diode 610. Wherein, a cathode electrode of the flyback diode 610 electrically couples to one terminal of the output load 244 and the flyback transforming inductor 600 is induced each other with the boost input inductor 400. One terminal of the flyback transforming inductor 600 is grounded, and the other terminal is electrically coupled to an anode electrode of the flyback diode 610. With such improvement, the voltage measured on the half-bridge output terminal 2144 is more smooth as shown in the $V_{2144b}$ of FIG. 11.

After converting by the switching module 210, the signal output from the half-bridge output terminal 2144 is fed into the input terminal 2200 of the driving module 220. Referring to FIG. 2 again, wherein the driving module 220 electrically couples to the bulk output terminal 2124 and the half-bridge output terminal 2144 of the switching module 210. The driving module 220 blocks the DC bias output from the half-bridge output terminal 2144, and generates a driving signal which is then propagated to the output terminal 2204 and used to drive the piezo transformer 230 after the signal obtained from blocking the DC bias is resonated.

Figure 7A:
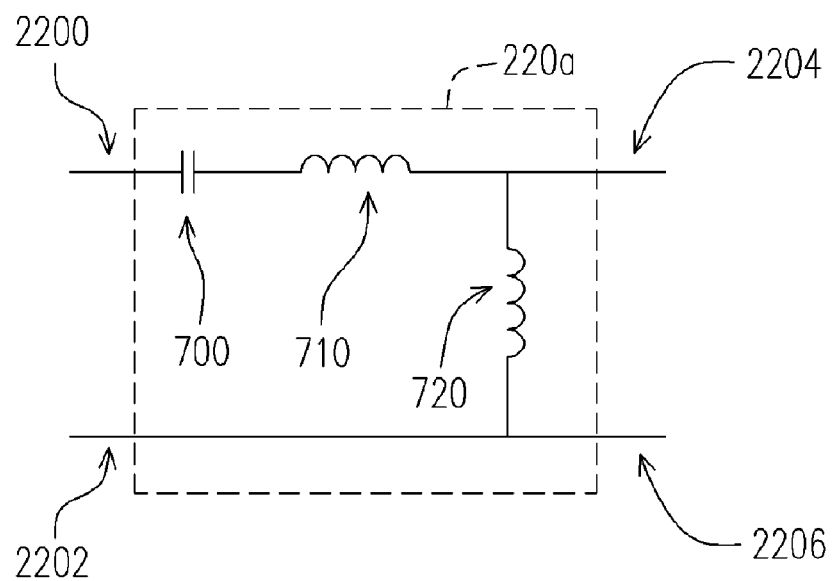
FIGS. 7A~7E are the schematic diagrams of the driving modules used by the embodiments of the present invention.

Hereinafter, a couple of circuits which can be used as the driving module 220 are described, and the like elements are marked same numbers. Referring to FIG. 7A, it schematically shows a circuit diagram of the driving module used in an embodiment of the present invention. In the present embodiment, the driving module 220a comprises a capacitor 700, and inductors 710 and 720. Wherein, one terminal of the capacitor 700 electrically couples to the half-bridge output terminal 2144 to be an input terminal 2200 of the driving module 220a. The other terminal of the capacitor 700 electrically couples to one terminal of the inductor 710. The other terminal of the inductor 710 electrically couples to one terminal of the inductor 720 to serve as an output terminal 2204 of the driving module 220a. The other terminal of the inductor 720 electrically couples to the bulk output terminal 2124 to serve as the other input terminal 2202 and the output terminal 2206 of the driving module 220a.

Figure 7B:
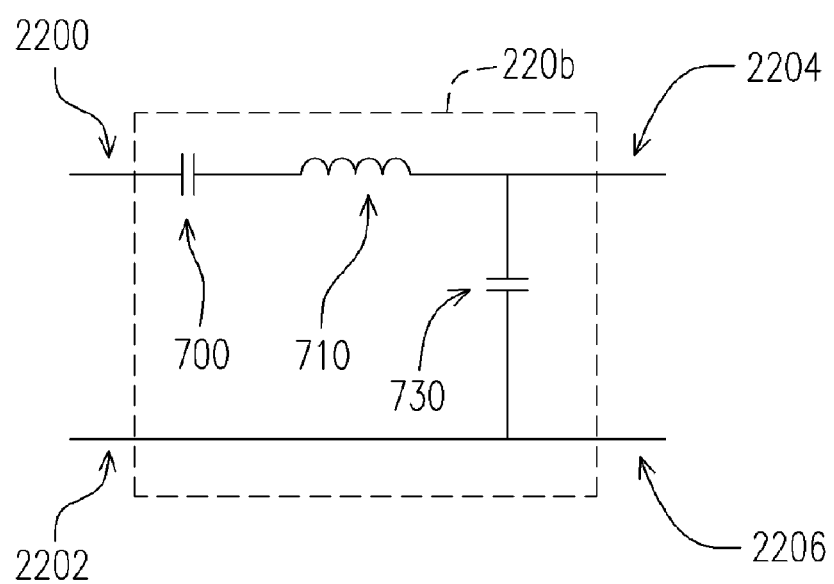

Referring to FIG. 7B, a circuit diagram of the driving module used in another of the present invention is schematically shown. In the present embodiment, the driving module 220b comprises capacitors 700 and 730, and an inductor 710. Wherein, one terminal of the capacitor 700 electrically couples to the half-bridge output terminal 2144 to serve as the input terminal 2200 of the driving module 220b. The other terminal of the capacitor 700 electrically couples to one terminal of the inductor 710. The other terminal of the inductor 710 electrically couples to one terminal of the capacitor 730 to serve as the output terminal 2204 of the driving module 220b. The other terminal of the capacitor 730 electrically couples to the boost output terminal 2124 to serve the other input terminal 2202 and the output terminal 2206 of the driving module 220b.

Figure 7C:
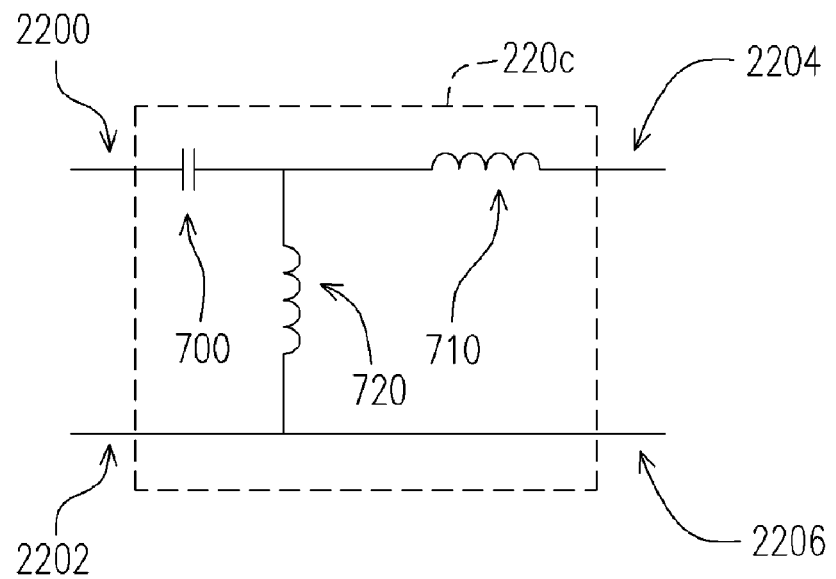

Referring to FIG. 7C, it schematically shows a circuit diagram of the driving module used in another embodiment of the present invention. In the present embodiment, the driving module 220c comprises a capacitor 700, and inductors 710 and 720. Wherein, one terminal of the capacitor 700 electrically couples to the half-bridge output terminal 2144 to serve as the input terminal 2200 of the driving module 220c. The other terminal of the capacitor 700 electrically couples to one terminal of the inductors 710 and 720. The other terminal of the inductor 710 electrically couples to the output terminal 2204 of the driving module 220c. The other terminal of the inductor 720 electrically couples to the bulk output terminal 2124 to serve as the other input terminal 2202 and the output terminal 2206 of the driving module 220c.

Figure 7D:
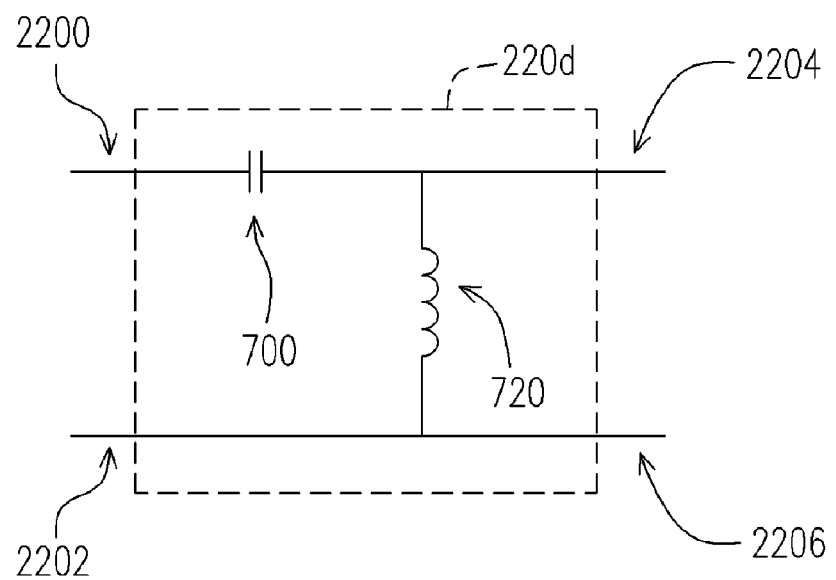

Referring to FIG. 7D, a circuit diagram of the driving module used in another embodiment of the present invention is schematically shown. In the present embodiment, the driving module 220d comprises a capacitor 700 and an inductor 720. Wherein, one terminal of the capacitor 700 electrically couples to the half-bridge output terminal 2144 to serve as the input terminal 2200 of the driving module 220d. The other terminal of the capacitor 700 electrically couples to one terminal of the inductor 720 to serve the output terminal 2204 of the driving module 220d. The other terminal of the inductor 720 electrically couples to the boost output terminal 2124 to serve the other input terminal 2202 and the output terminal 2206 of the driving module 220d.

Figure 7E:
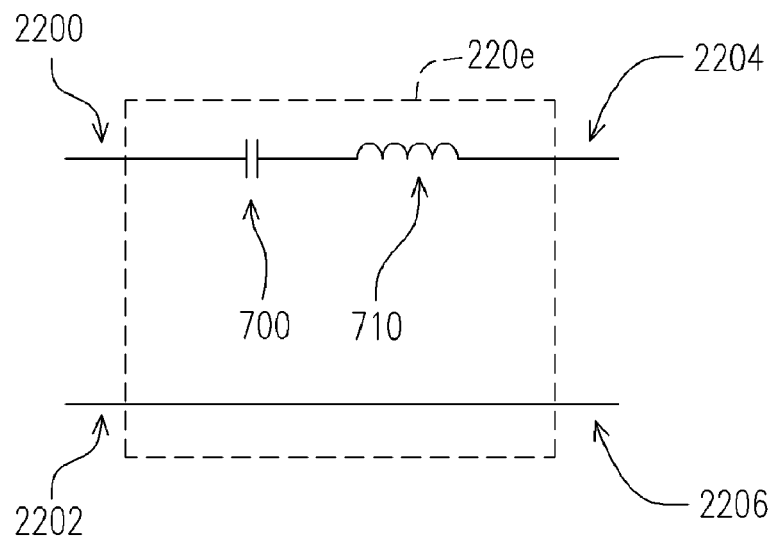

Referring to FIG. 7E, a circuit diagram of the driving module used in another embodiment of the present invention is schematically shown. In the present embodiment, the driving module 220e comprises a capacitor 700 and an inductor 710. Wherein, one terminal of the capacitor 700 electrically couples to the half-bridge output terminal 2144 to serve the input terminal 2200 of the driving module 220e. The other terminal of the capacitor 700 electrically couples to one terminal of the inductor 710, and the other terminal of the inductor 710 is the output terminal 2204 of the driving module 220e.

Referring to FIG. 2 again, after the driving module 220 generates a driving signal, the piezo transformer 230 converts the voltage according to the driving signal, so as to generate and propagate a corresponding piezo transforming signal to the output rectification module 240. Since the piezo transformer 230 is well known to the one of the ordinary skill in the art, its detail description is omitted herein. On the other hand, the output rectification module 240 can be divided into a rectification circuit 242 and a load 244. Both terminals of the load 244, i.e. the output terminals 2402 and 2404 which connect to outside, propagates the DC voltage $V_O$ mentioned above. In order to let one of the ordinary skill in the art easily implement the present invention, a detail circuit of the output rectification module 240 which can be used is exemplified in FIG. 8A~8C, respectively.

Figure 8A:
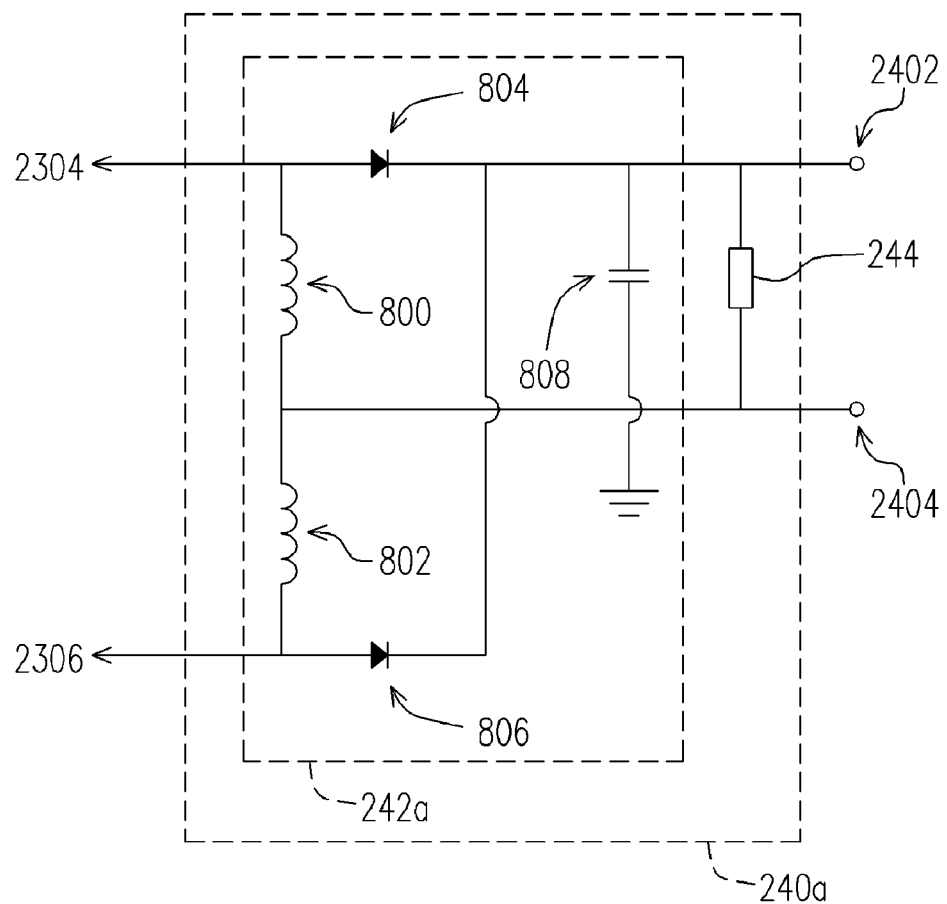
FIGS. 8A~8C schematically shows detail circuit diagram of the output rectification module used in an embodiment of the present invention, respectively.

Referring to FIG. 8A, the rectification circuit 242a in the output rectification module 240a comprises inductors 800 and 802, diodes 804 and 806, and a capacitor 808. One terminal of the inductor 800 electrically couples to an output terminal 2304 of the piezo transformer 230 and an anode electrode of the diode 804. The other terminal of the inductor 800 electrically couples to the other terminal of the inductor 802 and the output load 244. The other terminal of the inductor 802 electrically couples to the other output terminal 2306 of the piezo transformer 230 and an anode electrode of the diode 806. A cathode of the diode 804 electrically couples to a cathode electrode of the diode 806, one terminal of the capacitor 808, and the other terminal of the output load 244. The other terminal of the capacitor 808 is grounded or electrically coupled to the output terminal 2404.

Figure 8B:
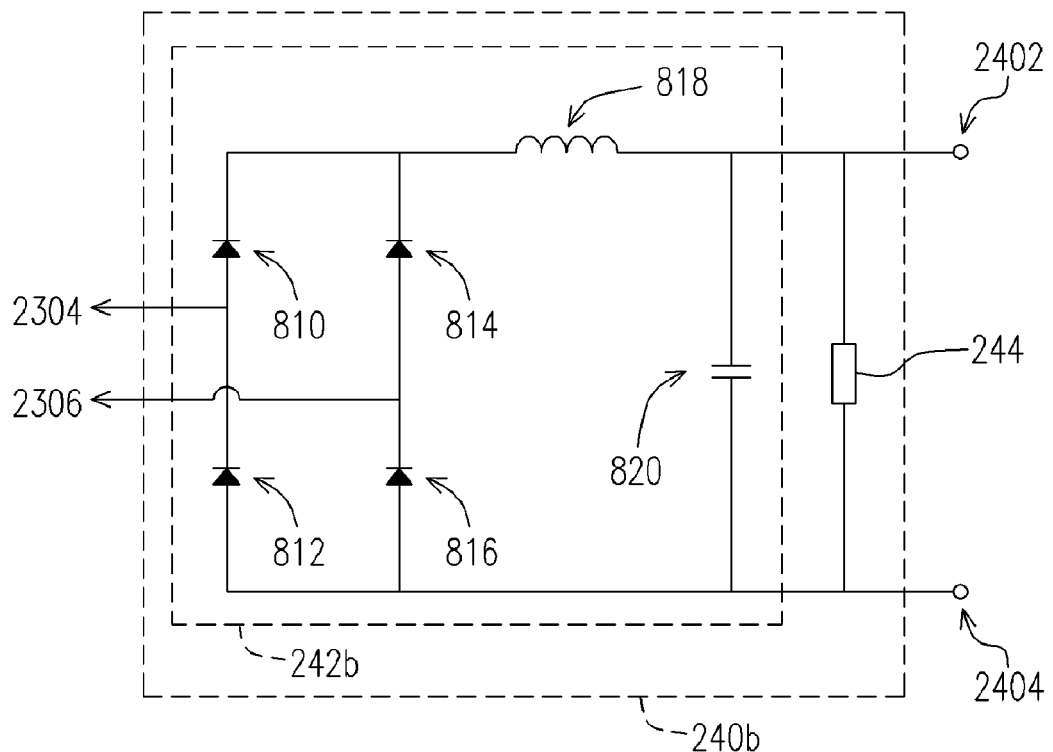

Furthermore, referring to FIG. 8B, a circuit diagram of the output rectification circuit used in another embodiment of the present invention is schematically shown. The rectification circuit 242b in the output rectification module 240b of the present embodiment comprises diodes 810, 812, 814 and 816, an inductor 818, and a capacitor 820. Wherein, an anode electrode of the diode 810 electrically couples to a cathode electrode of the diode 812 and the output terminal 2304 of the piezo transformer 230. An anode electrode of the diode 814 electrically couples to a cathode electrode of the diode 816 and the other output terminal 2306 of the piezo transformer 230. In addition, the cathode electrodes of the diodes 810 and 814 electrically couple to one terminal of the inductor 818, and the other terminal of the inductor electrically couples to one terminal 2402 of the capacitor 820 and the output load 244. The anode electrodes of the diodes 812 and 816 electrically couple to the other terminal 2404 of the capacitor 820 and the output load 244.

Figure 8C:
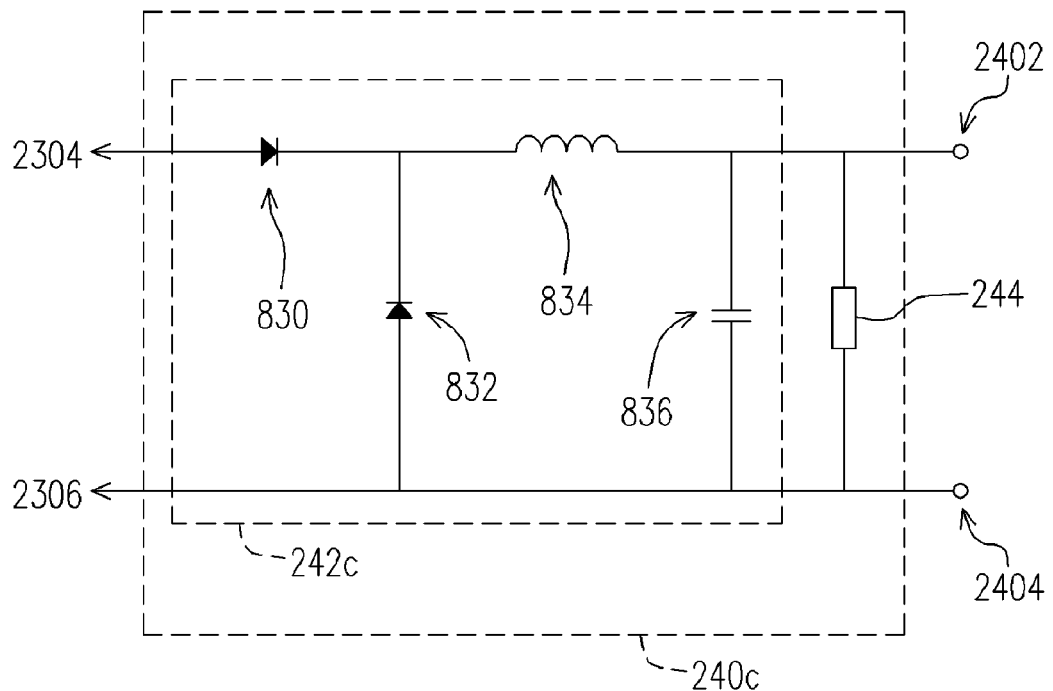

Referring to FIG. 8C, the rectification circuit 242c in the output rectification module 240c of the present embodiment comprises diodes 830 and 832, an inductor 834, and a capacitor 836. Wherein, an anode electrode of the diode 830 electrically couples to the output terminal 2304 of the piezo transformer 230, and a cathode electrode of the diode 830 electrically couples to a cathode electrode of the diode 832 and one terminal of the inductor 834. The other terminal of the inductor 834 electrically couples to one terminal 2402 of the capacitor 836 and the output load 244. An anode electrode of the diode 832 electrically couples to the other output terminal 2306 of the piezo transformer 230 and the other terminal 2404 of the capacitor 836 and the output load 244.

Figure 9:
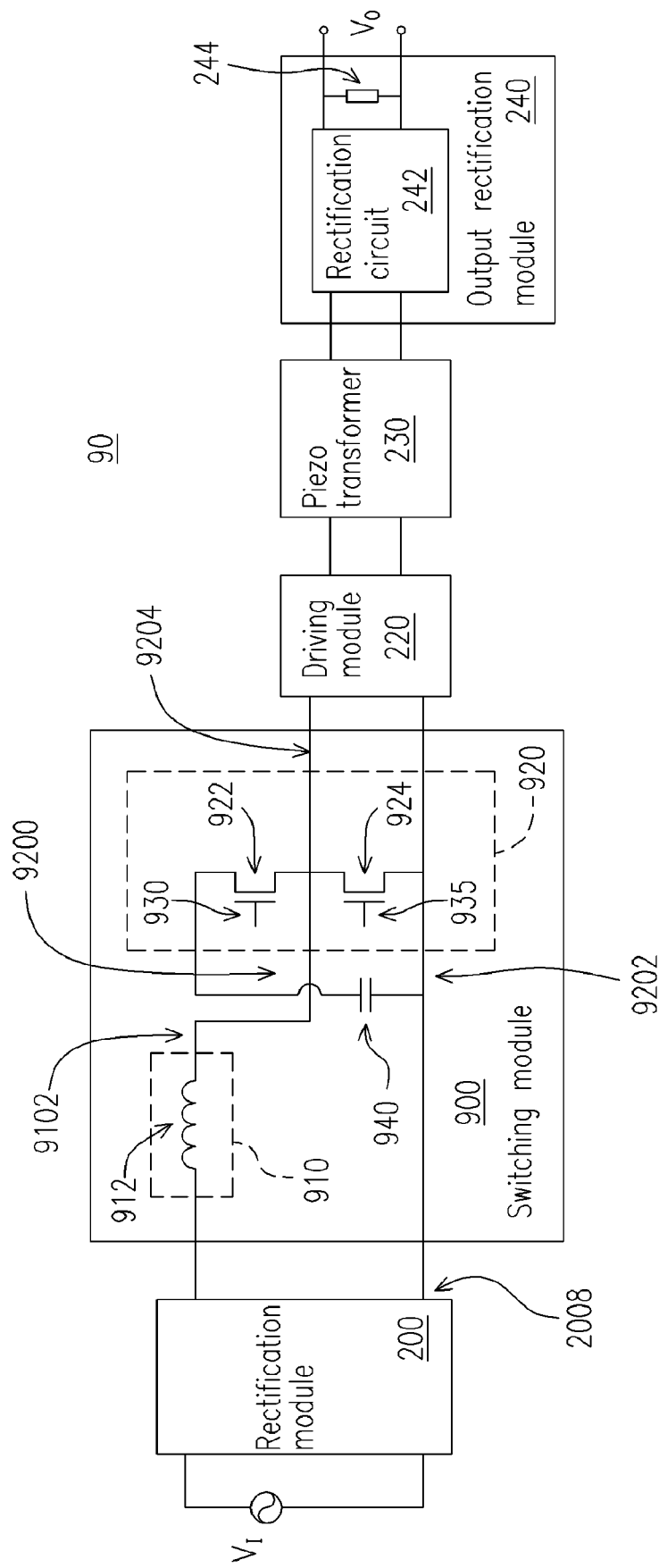
FIG. 9 is a schematic circuit diagram of a single stage AC/DC converter with piezo transformer according to another embodiment of the present invention.
Figure 10:
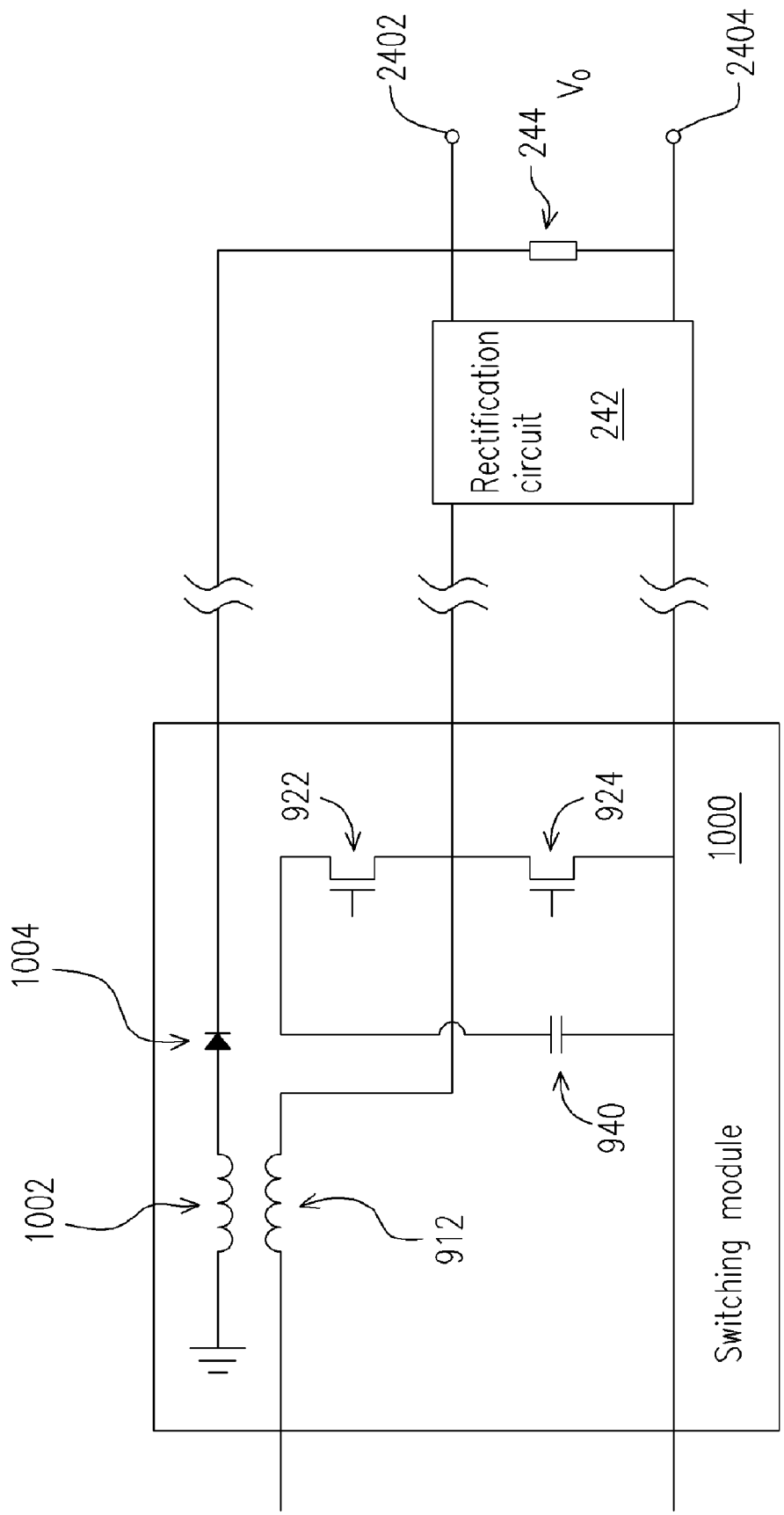
FIG. 10 is a schematic circuit diagram of a switching module used in another embodiment of the present invention.

In addition to the embodiments mentioned above, the present invention further provides a single stage AC/DC converter which combines the bulk circuit and the half-bridge circuit together. Referring to FIG. 9, it schematically shows a circuit diagram of a single stage AC/DC converter with piezo transformer according to another embodiment of the present invention. In the present embodiment, most components constituting the single stage AC/DC converter 90 and its connection are the same as the circuits shown in FIGS. 3A, 3B and 7~8 except for the implementation of the switching module 900. Therefore, the detail circuit of the switching module is described hereinafter, whereas other circuits will be omitted.

As shown in FIG. 9, the switching module 900 comprises a bulk circuit 910, a half-bridge circuit 920 and a half-bridge capacitor 940. Wherein, the bulk circuit 910 is composed of a single bulk input inductor 912. One terminal of the switch 922 in the half-bridge circuit 920 electrically couples to one terminal of the half-bridge capacitor 940, and the other terminal electrically couples to a bulk output terminal 9102 of the bulk circuit 910 and a half-bridge output terminal 9204, respectively. One terminal of the switch 924 electrically couples to the half-bridge output terminal 9204, and the other terminal electrically couples to the other terminal of the half-bridge capacitor 940 and a rectification output terminal 2008 of the rectification module 200.

However, such circuit configuration makes a surge as shown in $V_{2144a}$ of FIG. 11 occur on the half-bridge output terminal 9204. In order to solve this problem, a flyback transforming inductor 1002 and a flyback diode 1004 are included into the switching module 900. Wherein, a cathode of the flyback diode 1004 electrically couples to one terminal of the output load 244, and the flyback transforming inductor 1002 is induced each other with the bulk input inductor 912. One terminal of the flyback transforming inductor 1002 is connected to the ground terminal, and the other terminal of the flyback transforming inductor 1002 is electrically coupled to an anode electrode of the flyback diode 1004.

Accordingly, the aforementioned circuits allows the integration of the bulk circuit and the half-bridge circuit into a single stage switching module. Accordingly, a simple circuit can be used to operate the single stage AC/DC converter with piezo transformer.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. A single stage AC/DC converter with piezo transformer suitable for converting an AC power into a DC power, comprising:
   a rectification module, having a pair of rectification input terminals, a first rectification output terminal and a second rectification output terminal, wherein the pair of rectification input terminals receives the AC power and converts the AC power into a rectification output signal which is then output from the first rectification output terminal;
   a switching module, comprising:
      a bulk circuit, having a bulk input terminal, a first bulk output terminal and a second bulk output terminal, wherein the bulk input terminal electrically couples to the first rectification output terminal for receiving the rectification output signal, and a bulk signal is generated from the first bulk output terminal after the rectification output signal is processed by the bulk circuit;
      a half-bridge circuit, having a first half-bridge input terminal, a second half-bridge input terminal and a half-bridge output terminal, wherein the first half-bridge input terminal electrically couples to the first bulk output terminal, and the second half-bridge input terminal electrically couples to the second rectification output terminal;
      a first switching diode, wherein an anode electrode of the first switching diode electrically couples to the second half-bridge input terminal, and a cathode electrode of the first switching diode electrically couples to the second bulk output terminal; and
      a second switching diode, wherein an anode electrode of the second switching diode electrically couples to the second bulk output terminal, and a cathode electrode of the second switching diode electrically couples to the half-bridge output terminal;
   a driving module, electrically coupling to the second bulk output terminal and the half-bridge output terminal of the switching module for blocking a DC bias output from the half-bridge output terminal, and generating a driving signal after the signal obtained from blocking the DC bias is resonated;
   a piezo transformer, generating a corresponding piezo transforming signal according to the driving signal; and
   an output rectification module, having a rectification circuit and an output load, wherein the rectification circuit rectifies the piezo transforming signal and outputs the DC power from both sides of the output load.

2. The single stage AC/DC converter with piezo transformer of claim 1, wherein the bulk circuit comprises:
   a bulk input inductor, wherein one terminal of the bulk input inductor electrically couples to the first rectification output terminal, and another terminal of the bulk input inductor electrically couples to the first bulk output terminal;
   a bulk capacitor, wherein one terminal of the bulk capacitor electrically couples to the first bulk output terminal, and another terminal of the bulk capacitor electrically couples to the second bulk output terminal; and
   a bulk diode, wherein an anode electrode of the bulk diode electrically couples to the second bulk output terminal, and a cathode electrode of the bulk diode electrically couples to the first rectification output terminal.

3. The single stage AC/DC converter with piezo transformer of claim 2, wherein the switching module further comprises:
   a flyback diode, wherein a cathode electrode of the flyback diode electrically couples to one terminal of the output load; and
   a flyback transforming inductor induced each other with the bulk input inductor, wherein one terminal of the flyback transforming inductor is connected to a ground terminal, and another terminal of the flyback transforming inductor is electrically coupled to an anode electrode of the flyback diode.

4. The single stage AC/DC converter with piezo transformer of claim 1, wherein the half-bridge circuit comprises:
   a first switch, wherein a first terminal of the first switch receives the boost signal, and a second terminal of the first switch electrically couples to the half-bridge output terminal; and
   a second switch, wherein a first terminal of the second switch electrically couples to the half-bridge output terminal, and a second terminal of the second switch electrically couples to the second rectification output terminal.

5. The single stage AC/DC converter with piezo transformer of claim 1, wherein the rectification module comprises:
   a diode bridge rectifier, wherein an input terminal of the diode bridge rectifier electrically couples to the pair of the rectification input terminals for receiving the AC power, and an output terminal of the diode bridge rectifier electrically couples to the first rectification output terminal and the second rectification output terminal; and
   a rectification capacitor, wherein one terminal of the rectification capacitor electrically couples to the first rectification output terminal, and the other terminal of the rectification capacitor electrically couples to the second rectification output terminal.

6. The single stage AC/DC converter with piezo transformer of claim 1, wherein the rectification module comprises:
   a diode bridge rectifier, wherein an input terminal of the diode bridge rectifier electrically couples to the pair of the rectification input terminals for receiving the AC power, and an output terminal of the diode bridge rectifier electrically couples to the first rectification output terminal and the second rectification output terminal.

7. The single stage AC/DC converter with piezo transformer of claim 1, wherein the driving module comprises:
   a capacitor;
   a first inductor; and
   a second inductor,
   wherein, one terminal of the capacitor electrically couples to the half-bridge output terminal, another terminal of the capacitor electrically couples to one terminal of the first inductor, another terminal of the first inductor electrically couples to one terminal of the second inductor to serve as an output terminal of the driving module, and the other terminal of the second inductor electrically couples to the second bulk output terminal to serve another output terminal of the driving module.

8. The single stage AC/DC converter with piezo transformer of claim 1, wherein the driving module comprises:
   a first capacitor;
   an inductor; and
   a second capacitor,
   wherein, one terminal of the first capacitor electrically couples to the half-bridge output terminal, another terminal of the first capacitor electrically couples to one terminal of the inductor, another terminal of the inductor electrically couples to one terminal of the second capacitor to serve an output terminal of the driving module, and other terminal of the second capacitor electrically couples to the second bulk output terminal to serve as another output terminal of the driving module.

9. The single stage AC/DC converter with piezo transformer of claim 1, wherein the driving module comprises:
   a capacitor;
   a first inductor; and
   a second inductor,
   wherein, one terminal of the capacitor electrically couples to the half-bridge output terminal, another terminal of the capacitor electrically couples to one terminal of the first inductor and one terminal of the second inductor, another terminal of the first inductor is an output terminal of the driving module, and another terminal of the second inductor electrically couples to the second bulk output terminal to serve as another output terminal of the driving module.

10. The single stage AC/DC converter with piezo transformer of claim 1, wherein the driving module comprises:
    a capacitor; and
    an inductor,
    wherein, one terminal of the capacitor electrically couples to the half-bridge output terminal, another terminal of the capacitor electrically couples to one terminal of the inductor to serve an output terminal of the driving module, and another terminal of the inductor electrically couples to the second bulk output terminal to serve another output terminal of the driving module.

11. The single stage AC/DC converter with piezo transformer of claim 1, wherein the driving module comprises:
    a capacitor; and
    an inductor,
    wherein, one terminal of the capacitor electrically couples to the half-bridge output terminal, another terminal of the capacitor electrically couples to one terminal of the inductor, and another terminal of the inductor is an output terminal of the driving module.

12. The single stage AC/DC converter with piezo transformer of claim 1, wherein the piezo transformer comprises two output terminals, and the rectification circuit comprises a first inductor, a second inductor, a first diode, a second diode and a capacitor, wherein, one terminal of the first inductor electrically couples to one output terminal of the piezo transformer and an anode electrode of the first diode, another terminal of the first inductor electrically couples to one terminal of the second inductor and one terminal of the output load, another terminal of the second inductor electrically couples to the other output terminal of the piezo transformer and an anode electrode of the second diode, a cathode electrode of the first diode electrically couples to a cathode electrode of the second diode, one terminal of the capacitor, and another terminal of the output load, and another terminal of the capacitor is grounded.

13. The single stage AC/DC converter with piezo transformer of claim 1, wherein the piezo transformer comprises two output terminals, and the rectification circuit comprises an inductor, a first diode, a second diode, a third diode, a fourth diode and a capacitor, wherein, an anode electrode of the first diode electrically couples to a cathode electrode of the second diode and one output terminal of the piezo transformer, an anode electrode of the third diode electrically couples to a cathode electrode of the fourth diode and the other output terminal of the piezo transformer, a cathode electrode of the first diode and a cathode electrode of the third diode electrically couple to one terminal of the inductor, the other terminal of the inductor electrically couples to one terminal of the capacitor and one terminal of the output load, and an anode electrode of the second diode and the anode electrode of the third diode electrically couple to the other terminal of the capacitor and the other terminal of the output load.

14. The single stage AC/DC converter with piezo transformer of claim 1, wherein the piezo transformer comprises two output terminals, and the rectification circuit comprises an inductor, a first diode, a second diode and a capacitor, wherein, an anode electrode of the first diode electrically couples to one output terminal of the piezo transformer, a cathode electrode of the first diode electrically couples to a cathode electrode of the second diode and one terminal of the inductor, another terminal of the inductor electrically couples to one terminal of the capacitor and one terminal of the output load, and an anode electrode of the second diode electrically couples to another terminal of the piezo transformer, the other terminal of the capacitor, and the other terminal of the output load.

15. A single stage AC/DC converter with piezo transformer suitable for converting an AC power into a DC power, comprising:
    a rectification module, having a pair of rectification input terminals, a first rectification output terminal, and a second rectification output terminal, wherein the pair of rectification input terminals receives the AC power, converts the AC power into a rectification output signal which is then output from the first rectification output terminal;
    a switching module, comprising:
       a bulk circuit having a bulk input terminal and a bulk output terminal, wherein the bulk input terminal electrically couples to the first rectification output terminal for receiving the rectification output signal, and a bulk signal is generated from the bulk output terminal after the rectification output signal is processed by the bulk circuit;
       a half-bridge capacitor; and
       a half-bridge circuit, having a first switch, a second switch, and a half-bridge output terminal, wherein one terminal of the first switch electrically couples to one terminal of the half-bridge capacitor, another terminal of the first switch electrically couples to one terminal of the second switch, the half-bridge output terminal, and the bulk output terminal, another terminal of the second switch electrically couples to the other terminal of the half-bridge capacitor and the second rectification output terminal;
    a driving module, electrically coupling to half-bridge output terminal and the second rectification output terminal for blocking a DC bias output from the half-bridge output terminal, and generating a driving signal after the signal obtained from blocking the DC bias is resonated;

a piezo transformer, generating a corresponding piezo transforming signal according to the driving signal; and an output rectification module, having a rectification circuit and an output load, wherein the rectification circuit rectifies the piezo transforming signal and outputs the DC power from both sides of the output load.

16. The single stage AC/DC converter with piezo transformer of claim 15, wherein the bulk circuit comprises:

a bulk input inductor, wherein one terminal of the bulk input inductor electrically couples to the first rectification output terminal, and another terminal of the bulk input inductor electrically couples to the half-bridge output terminal.

17. The single stage AC/DC converter with piezo transformer of claim 16, wherein the switching module further comprises:

a flyback diode, wherein a cathode electrode of the flyback diode electrically couples to one terminal of the output load; and a flyback transforming inductor induced each other with the bulk input inductor, wherein one terminal of the flyback transforming inductor is grounded, and another terminal of the flyback transforming inductor is electrically coupled to an anode electrode of the flyback diode.

18. The single stage AC/DC converter with piezo transformer of claim 15, wherein the rectification module comprises:

a diode bridge rectifier, wherein an input terminal of the diode bridge rectifier electrically couples to the pair of the rectification input terminals for receiving the AC power, and an output terminal of the diode bridge rectifier electrically couples to the first rectification output terminal and the second rectification output terminal; and a rectification capacitor, wherein one terminal of the rectification capacitor electrically couples to the first rectification output terminal, and the other terminal of the rectification capacitor electrically couples to the second rectification output terminal.

19. The single stage AC/DC converter with piezo transformer of claim 15, wherein the rectification module comprises:

a diode bridge rectifier, wherein an input terminal of the diode bridge rectifier electrically couples to the pair of the rectification input terminals for receiving the AC power, and an output terminal of the diode bridge rectifier electrically couples to the first rectification output terminal and the second rectification output terminal.

20. The single stage AC/DC converter with piezo transformer of claim 15, wherein the driving module comprises:

a capacitor;

a first inductor; and a second inductor, wherein, one terminal of the capacitor electrically couples to the half-bridge output terminal, another terminal of the capacitor electrically couples to one terminal of the first inductor, another terminal of the first inductor electrically couples to one terminal of the second inductor to serve as an output terminal of the driving module, and the other terminal of the second inductor electrically couples to the second rectification output terminal.

21. The single stage AC/DC converter with piezo transformer of claim 15, wherein the driving module comprises:

a first capacitor;

an inductor; and a second capacitor, wherein, one terminal of the first capacitor electrically couples to the half-bridge output terminal, another terminal of the first capacitor electrically couples to one terminal of the inductor, another terminal of the inductor electrically couples to one terminal of the second capacitor to serve as an output terminal of the driving module, and another terminal of the second capacitor electrically couples to the second rectification output terminal.

22. The single stage AC/DC converter with piezo transformer of claim 15, wherein the driving module comprises:

a capacitor;

a first inductor, and a second inductor, wherein, one terminal of the capacitor electrically couples to the half-bridge output terminal, the other terminal of the capacitor electrically couples to one terminal of the first inductor and one terminal of the second inductor, another terminal of the first inductor is an output terminal of the driving module, and another terminal of the second inductor electrically couples to the second rectification output terminal.

23. The single stage AC/DC converter with piezo transformer of claim 15, wherein the driving module comprises:

a capacitor; and an inductor, wherein, one terminal of the capacitor electrically couples to the half-bridge output terminal, another terminal of the capacitor electrically couples to one terminal of the inductor to serve as an output terminal of the driving module, and another terminal of the inductor electrically couples to the second rectification output terminal.

24. The single stage AC/DC converter with piezo transformer of claim 15, wherein the driving module comprises:

a capacitor; and an inductor, wherein, one terminal of the capacitor electrically couples to the half-bridge output terminal, another terminal of the capacitor electrically couples to one terminal of the inductor, and the other terminal of the inductor is an output terminal of the driving module.

25. The single stage AC/DC converter with piezo transformer of claim 15, wherein the piezo transformer comprises two output terminals, and the rectification circuit comprises a first inductor, a second inductor, a first diode, a second diode and a capacitor, wherein, one terminal of the first inductor electrically couples to one output terminal of the piezo transformer and an anode electrode of the first diode, another terminal of the first inductor electrically couples to one terminal of the second inductor and one terminal of the output load, another terminal of the second inductor electrically couples to another output terminal of the piezo transformer and an anode electrode of the second diode, a cathode electrode of the first diode electrically couples to a cathode electrode of the second diode, one terminal of the capacitor, and the other terminal of the output load, and another terminal of the capacitor is connected to a ground terminal.

26. The single stage AC/DC converter with piezo transformer of claim 15, wherein the piezo transformer comprises two output terminals, and the rectification circuit comprises an inductor, a first diode, a second diode, a third diode, a fourth diode and a capacitor, wherein, an anode electrode of the first diode electrically couples to a cathode electrode of the second diode and one output terminal of the piezo transformer, an anode electrode of the third diode electrically couples to a cathode electrode of the fourth diode and another output terminal of the piezo transformer, a cathode electrode of the first diode and a cathode electrode of the third diode electrically couple to one terminal of the inductor, another terminal of the inductor electrically couples to one terminal of the capacitor and one terminal of the output load, and an anode electrode of the second diode and the anode electrode of the third diode electrically couple to another terminal of the capacitor and the other terminal of the output load.

27. The single stage AC/DC converter with piezo transformer of claim 15, wherein the piezo transformer comprises two output terminals, and the rectification circuit comprises an inductor, a first diode, a second diode and a capacitor, wherein, an anode electrode of the first diode electrically couples to one output terminal of the piezo transformer, a cathode electrode of the first diode electrically couples to a cathode electrode of the second diode and one terminal of the inductor, another terminal of the inductor electrically couples to one terminal of the capacitor and one terminal of the output load, and an anode electrode of the second diode electrically couples to the other terminal of the piezo transformer, the other terminal of the capacitor and another terminal of the output load.

* * * * *